United States Patent
Pahle

(10) Patent No.: US 8,037,980 B2
(45) Date of Patent: Oct. 18, 2011

(54) BRAKE DISC

(75) Inventor: Wolfgang Pahle, Bad Wiessee (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 141 days.

(21) Appl. No.: 12/250,293

(22) Filed: Oct. 13, 2008

(65) Prior Publication Data
US 2009/0260933 A1 Oct. 22, 2009

Related U.S. Application Data

(63) Continuation of application No. PCT/EP2007/003250, filed on Apr. 12, 2007.

(30) Foreign Application Priority Data

Apr. 13, 2006 (DE) .......................... 10 2006 017 526
Jul. 27, 2006 (DE) .......................... 10 2006 034 763

(51) Int. Cl.
*F16D 65/12* (2006.01)
(52) U.S. Cl. ................................ 188/218 XL; 188/18 A
(58) Field of Classification Search ............ 188/218 XL, 188/18 A; 301/6.8
See application file for complete search history.

(56) References Cited

U.S. PATENT DOCUMENTS

| | | | |
|---|---|---|---|
| 6,139,215 A | 10/2000 | Kuehne et al. | |
| 6,564,913 B2 | 5/2003 | Baumgartner et al. | |
| 6,722,479 B2 * | 4/2004 | Baumgartner et al. | 188/218 XL |
| 2003/0006108 A1 * | 1/2003 | Larkin et al. | 188/218 XL |
| 2004/0207249 A1 | 10/2004 | Baumgartner et al. | |

FOREIGN PATENT DOCUMENTS

| | | |
|---|---|---|
| DE | G 94 06 595.0 U1 | 7/1994 |
| DE | 195 44 559 C1 | 7/1997 |
| DE | 196 28 331 A1 | 1/1998 |
| DE | 197 26 674 A1 | 1/1998 |
| DE | 197 51 522 C1 | 5/1999 |
| DE | 198 36 688 A1 | 3/2000 |
| DE | 198 07 184 C1 | 4/2000 |
| DE | 100 46 705 C1 | 7/2002 |
| DE | 101 33 985 A1 | 10/2002 |
| WO | WO 02/087901 A1 | 11/2002 |

OTHER PUBLICATIONS

International Search Report dated May 31, 2007 with English translation of relevant portions (three (3) pages).
International Preliminary Report on Patentability with English translation (Fifteen (15) pages).

* cited by examiner

*Primary Examiner* — Bradley King
(74) *Attorney, Agent, or Firm* — Crowell & Moring LLP

(57) ABSTRACT

A disc/hub connection for connecting the brake disc with the hub is provided. The brake disc has support elements on the inner peripheral area and the hub has cams. The hub has a pot-like, hollow cylinder section that merges with a disc section that extends outward radially. The disc section has support rods that extend outward axially and that extend into the area where the brake disc contacts the pot-like section and that merge with the cams that, in turn, engage between the support elements of the brake disc. The support rods radially-placed inside the extension of the brake disc do not, or only by way of thin connection rods, connect radially with the outer periphery of the pot-like section.

10 Claims, 6 Drawing Sheets

BRAKE DISC

CROSS-REFERENCE TO RELATED APPLICATIONS

This application is a continuation of PCT International Application No. PCT/EP2007/003250, filed Apr. 12, 2007, which claims priority under 35 U.S.C. §119 to German Patent Application No. DE 10 2006 017 526.3, filed Apr. 13, 2006, and German Patent Application No. DE 10 2006 034 763.3, filed Jul. 27, 2006, the entire disclosures of which are herein expressly incorporated by reference.

BACKGROUND AND SUMMARY OF THE INVENTION

The invention relates to a brake disc having a hub and a friction ring, which friction ring is connected with connecting webs. A disc/hub connection is provided for connecting the brake disc to the hub, wherein the brake disc has support elements at its inner peripheral region, and the hub is provided with cams which engage in the peripheral direction between the support elements and secure the support elements. The hub has a pot-like, hollow cylindrical section, which merges into a radially outwardly extending disc section.

DE 157 26674 A1, DE 158 07144 C1, DE 1575422 C1 and DE 155 44 559 C1 are cited as prior art. In the brake discs, to connect the brake disc to the hub, intermediate elements, for transmitting torque and force from the cams to the hub, are provided on the support elements of the disc. The intermediate elements can be fastened, for example, by use of bolts to the cams of the hub. Here, the cams of the hub firstly engage into the intermediate elements, and the intermediate elements secondly engage into the support elements, such that a reliable transmission of torque from the brake disc to the hub is ensured in both rotational directions.

The brake disc of DE 155 44 559 C1 has been proven per se, though further optimized cooling of the hub region is desirable.

The aim of the present invention is to solve this problem.

According to the invention, the disc section is provided with axially extending support webs which extend into the region in which the brake disc is seated on the pot-like section of the hub, and which serve as cams which engage between the support elements of the brake disc and secure the support elements on the hub in the peripheral direction, wherein, radially within the brake disc or within the brake disc ring, the support webs are not connected, or are connected only by narrow connecting webs, to the outer periphery of the pot-like section, in the latter case preferably in such a way as to generate a T-shape of the support webs with the connecting webs in a cross-sectional view, such that flow ducts for air are formed radially inward with respect to the support webs and the support elements.

Advantageous embodiments are described herein.

With respect to the prior art, the invention considerably improves the cooling of the hub/brake disc, since it permits an increased supply of air into the hub region. The invention also reduces the conduction of heat from the brake disc through the cams into the inner hub region.

The preferably selected axial fixing is particularly cost-effective and generally simple to assemble and disassemble.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
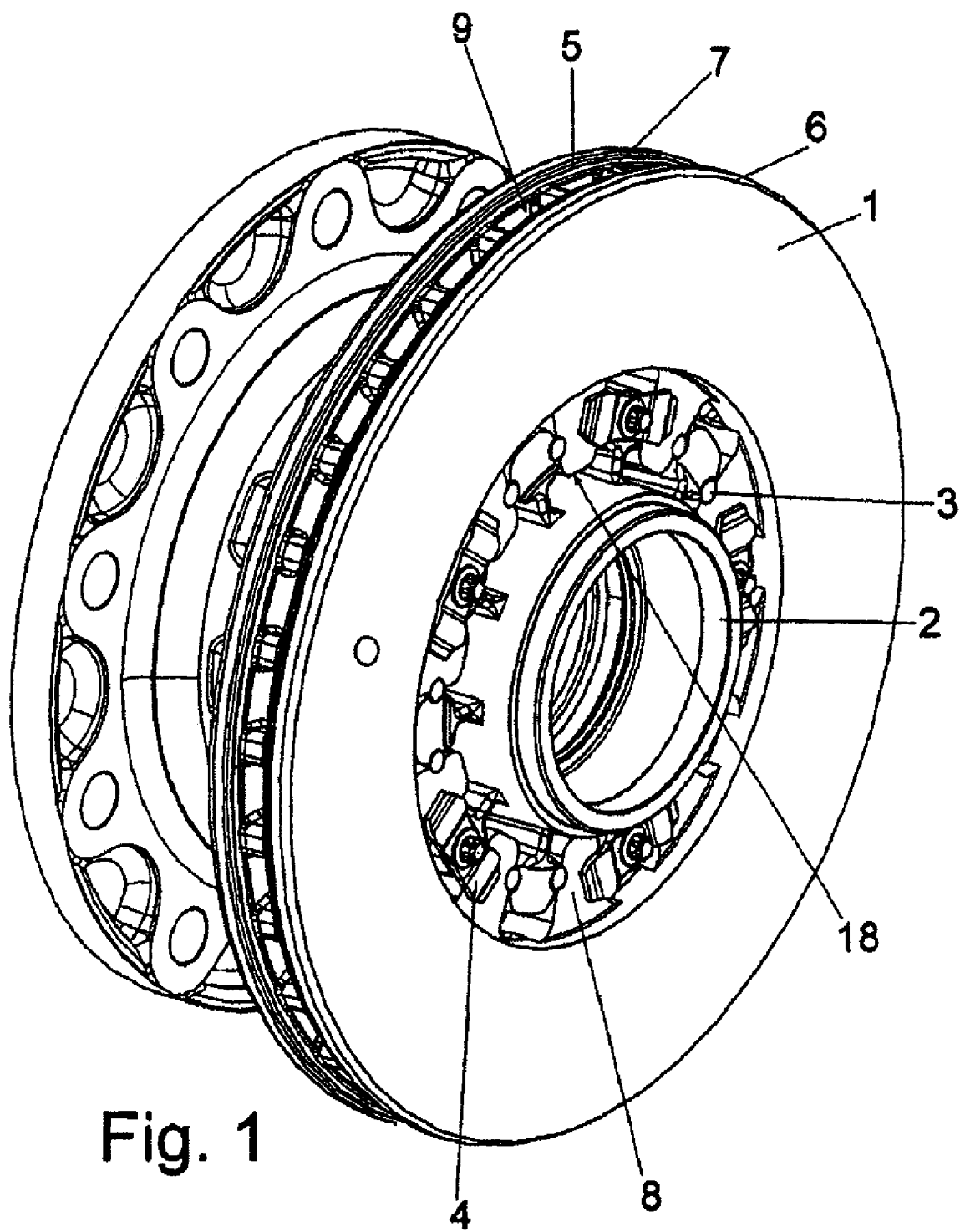
FIG. 1 shows a perspective view of a brake disc on a hub.
Figure 2:
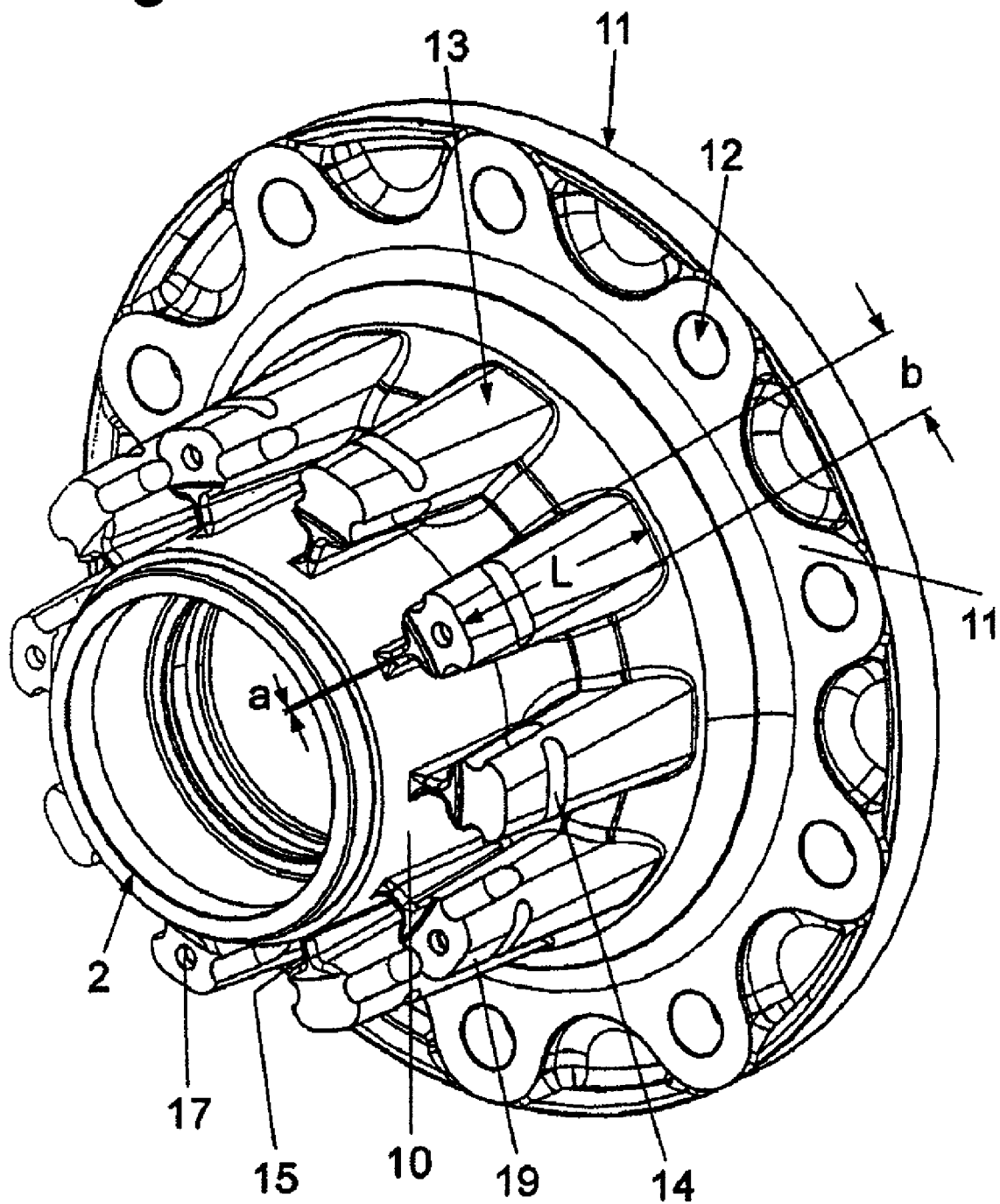
FIG. 2 shows a perspective view of the hub of FIG. 1.
Figure 3:
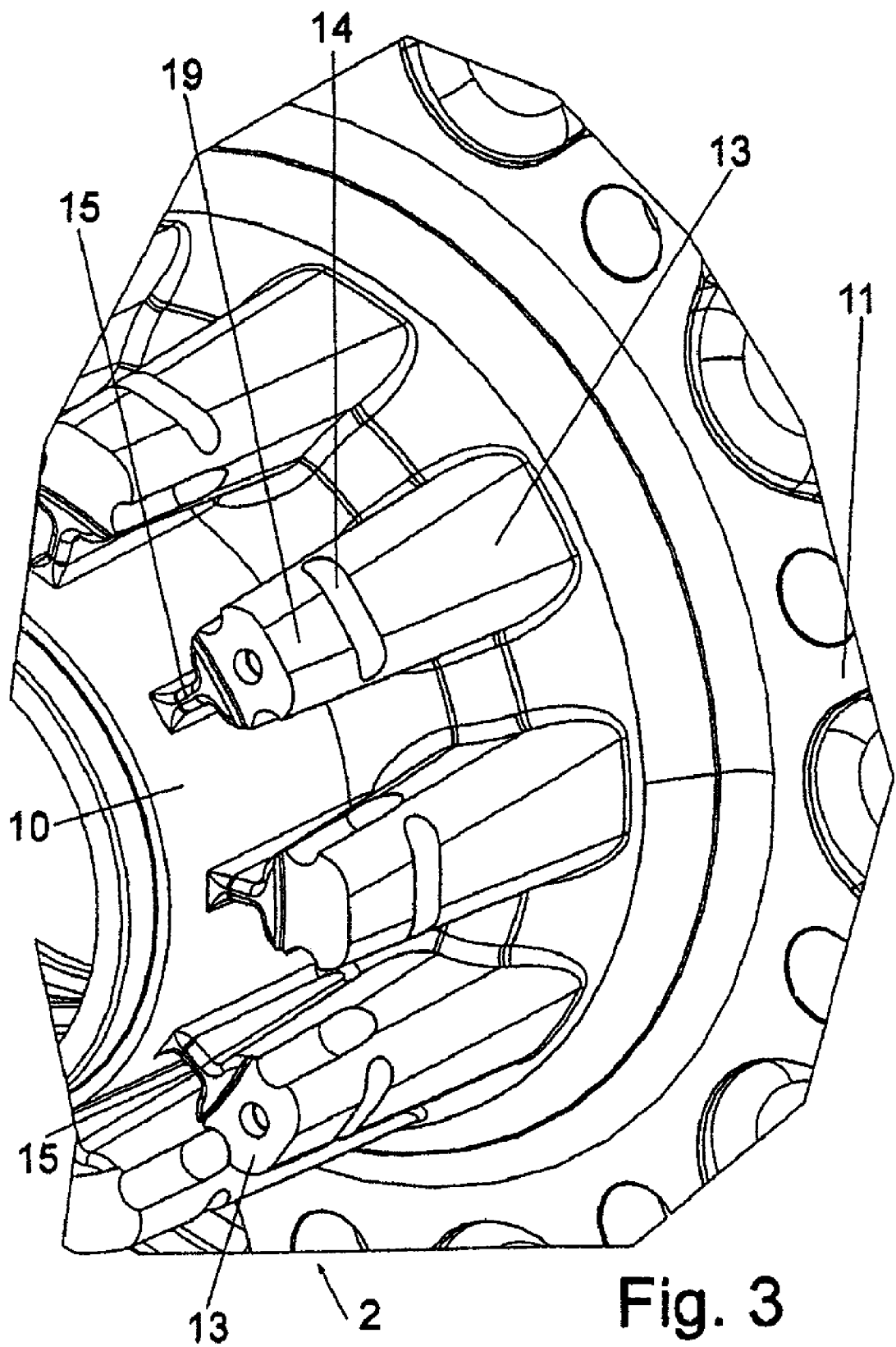
FIG. 3 shows a partially sectioned view of the hub of FIG. 2 in an enlarged illustration.
Figure 4:
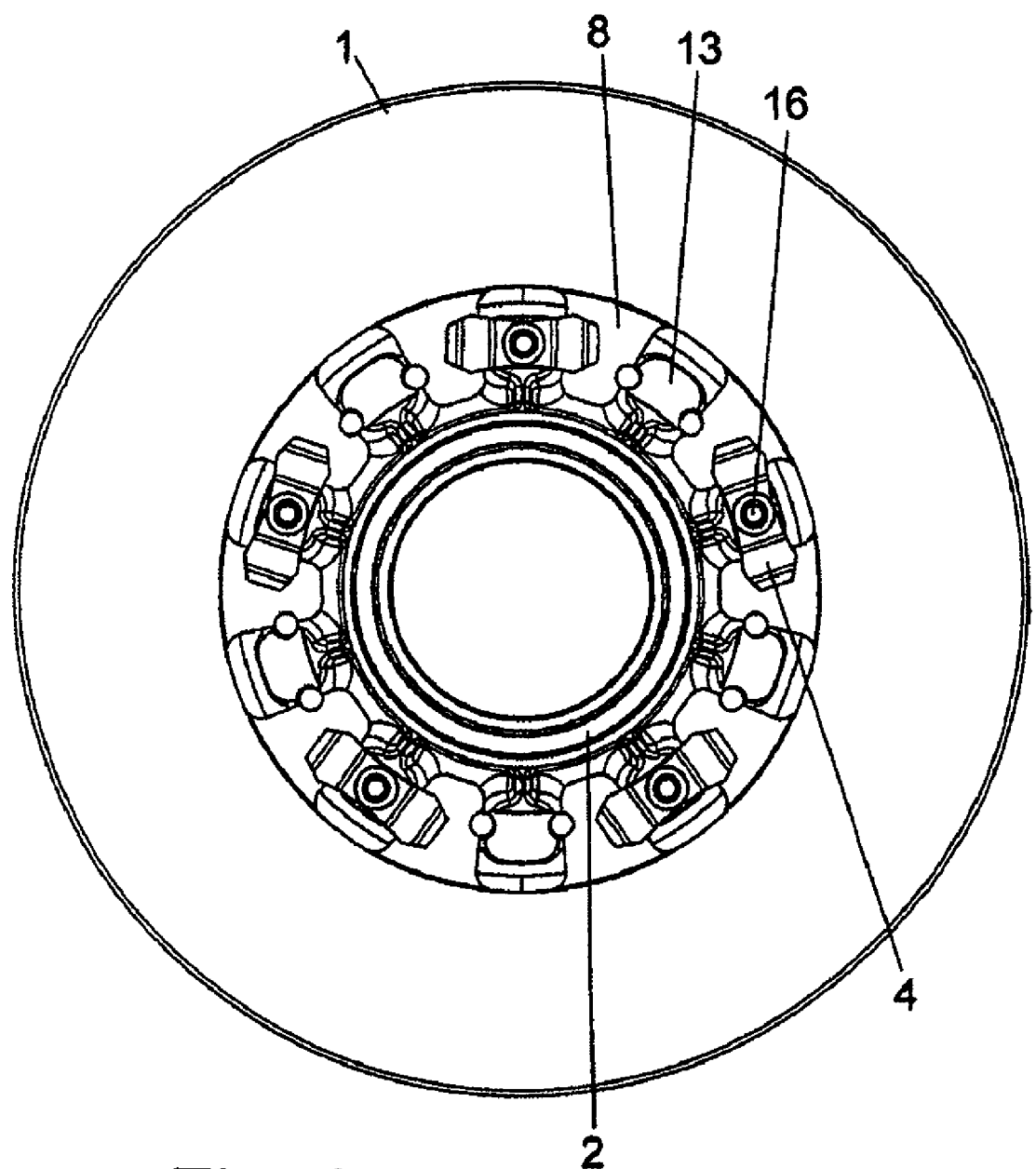
FIG. 4 shows a plan view of the arrangement of FIG. 1.
Figure 5:
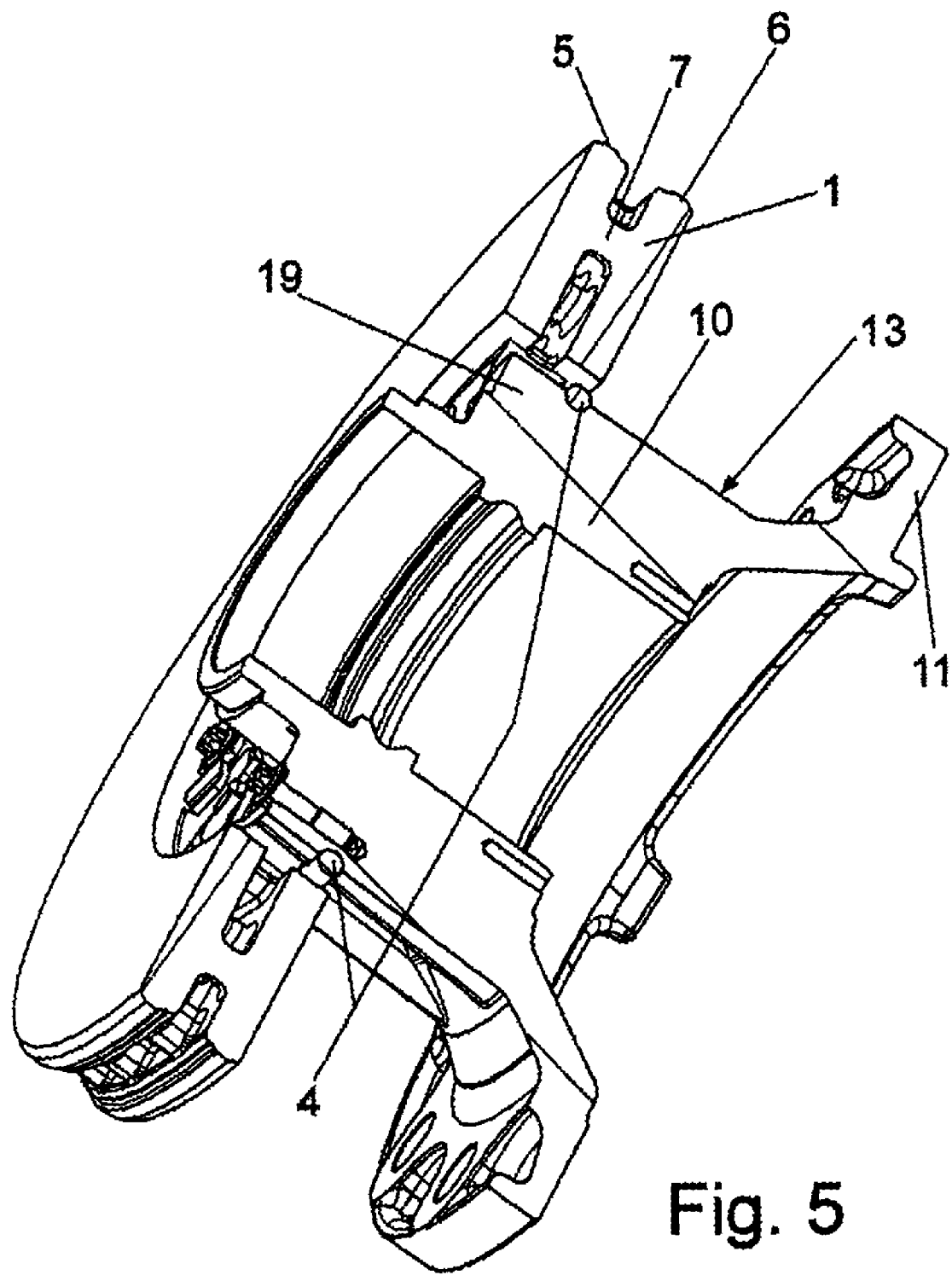
FIG. 5 shows a partially sectioned view of the arrangement of FIG. 1.

FIGS. 1 and 2 show a disc/hub connection having an internally ventilated brake disc 1, a disc and(/or) wheel hub 2, a plurality of intermediate elements 3 and securing elements 4.

The internally ventilated brake disc from FIG. 1, which is particularly suitable for heavy commercial vehicles with pneumatic disc brakes, has two friction rings 5, 6, which are connected to one another via connecting webs 7. Integrally formed on the inner periphery of the brake disc 1 are support elements 8, which project inward from the inner periphery of the friction rings 5, 6 in a substantially trapezoidal shape. During driving, cooling air is supplied between the support elements 8 into the air gap 9 formed between the friction rings 5, 6.

The wheel hub 2 of FIGS. 1 and 2 is composed of a pot-shaped, hollow cylindrical section 10, which merges at one axial end into a flange-shaped or ring-shaped disc section 11, which extends radially outward from the pot section 10. Bores 12 for wheel bolts (not shown here) are distributed on the outer periphery of the disc section 11. The disc section 11 is provided with support webs 13, which extend axially with respect to the disc section 11 into the region in which the brake disc 1 is seated on the pot-shaped section 10. Here, the end regions of the support webs 13 serve as cams 19, which engage between the support elements 8 of the brake disc 1 and secure or fix the support elements 8 in the peripheral direction in order to transmit torque between the hub 2 and the brake disc 1.

Here, the intermediate elements 3 are distributed between the support elements 8 and the support webs 13, which intermediate elements 3 are, in a preferred embodiment, designed as U-shaped wire clamps.

Figure 6:
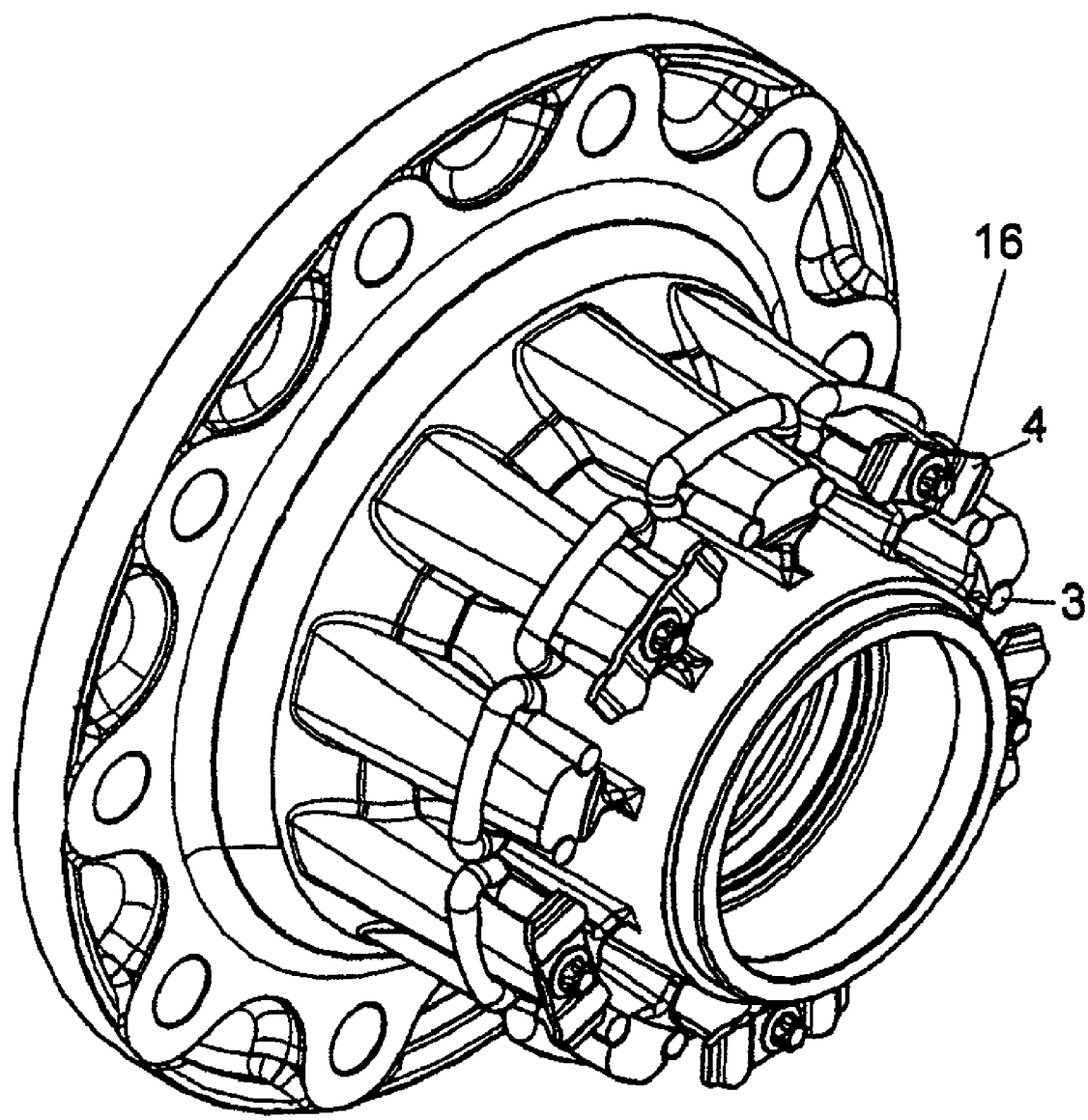
FIG. 6 shows a further perspective view of a hub region with fastening devices for a brake disc.

In the illustrated exemplary embodiment, the wire clamps 3 are seated in the groove 14. The elements 4 secure the brake disc position with respect to the vehicle inner side by use of screws 16, and at the same time, because of their resilient action, brace the brake disc against projections on the wire clamps (see FIG. 6, which shows the wire clamps 6 and the elements 4).

As a result of the support webs 13 having a substantially constant cross section (or even a cross section which increases in size), over their entire length up to the disc section 11, all of the forces, or at least the significant forces, during braking are introduced directly into the disc section 11.

This makes it possible for the support webs 13, in a radial direction radially relative to the brake disc, to not be connected at all, or to be connected only by narrow connecting webs 15, to the outer periphery of the pot-shaped section 10. In this connection, "narrow" means that the connecting webs 15 have an extent "a" in the circumferential direction, which extent a is less than 50%, in particular less than 25% of the extent of the support webs 13 in the region. The connecting webs 15 and the support webs 13 or the cams 18 thereby form a T-shape in an axial plan view.

In this way, large-dimensioned flow ducts 18 are defined radially within the support webs 13 of the hub and radially within the support elements 8 of the disc, which flow ducts 18 make it possible for the hub region within the brake disc 1 to be effectively cooled, with the conduction of heat into the hub 2 radially within the brake disc 1 also being reduced by the narrow connecting webs 15, as a result of which a bearing arrangement in the hub 2 is provided with virtually doubled the amount of protection from excess heating during braking processes.

Here, it is advantageous if the flow ducts 18 for air extend laterally up to the disc-like section 11.

| Table of reference symbols | |
|---|---|
| Brake disc | 1 |
| Disc and wheel hub | 2 |
| Intermediate elements | 3 |
| Securing element | 4 |
| Friction rings | 5, 6 |
| Webs | 7 |
| Support elements | 8 |
| Air gap | 9 |
| Hollow cylindrical section | 10 |
| Disc section | 11 |
| Bores | 12 |
| Support webs | 13 |
| Groove | 14 |
| Webs | 15 |
| Screws | 16 |
| Flow ducts | 18 |
| Cams | 19 |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A brake disc/hub connection for connecting a brake disc comprising friction rings connected via webs with a hub, the brake disc/hub connection comprising:
   a pot-like, hollow cylindrical section of the hub, at one end of which extends a radially outward disc section;
   support elements arranged about a radially inner peripheral region of the brake disc;
   axially extending support webs which extend from the disc section into a region in which the brake disc is seated on the pot-like, hollow cylindrical section of the hub, said axially extending support webs forming cams that are arranged about an outer peripheral region of the pot-like, hollow cylindrical section of the hub, said cams engaging between the support elements to secure the support elements on the hub in a peripheral direction; and
   wherein the cams are connected only via one narrow connecting web at each cam radially to the outer periphery of the pot-like, hollow cylindrical section of the hub, whereby air flow ducts are formed radially inward with respect to the support webs and the support elements,
   wherein the connecting webs have a width in a circumferential peripheral direction less than 50% of the extent of the support webs in the circumferential peripheral direction in a region of the brake disc.

2. The brake disc/hub connection according to claim 1, wherein the connecting webs have an extent in the circumferential peripheral direction less than 20% of the extent of the support webs in the circumferential peripheral direction in the region of the brake disc.

3. The brake disc/hub connection according to claim 1, wherein the support webs have a substantially constant cross-section.

4. The brake disc/hub connection according to claim 1, wherein the support webs have a cross-section which increases over their axially length toward the disc section.

5. The brake disc/hub connection according to claim 1, wherein the support webs are configured such that forces occurring during braking operation are introduced directly into the disc section via the support webs.

6. The brake disc/hub connection according to claim 1, wherein the air flow ducts extend axially up to the disc section.

7. The brake disc/hub connection according to claim 1, further comprising intermediate elements distributed between the support webs and the support elements.

8. The brake disc/hub connection according to claim 7, wherein the intermediate elements each have a U-shaped configuration.

9. The brake disc/hub connection according to claim 7, wherein the intermediate elements are formed as wire clamp elements.

10. The brake disc/hub connection according to claim 7, wherein the intermediate elements are configured as U-shaped wire clamps, the U-shaped wire clamps engaging into respective grooves formed on the support webs.

\* \* \* \* \*